US012397928B2

(12) United States Patent
Corvaglia et al.

(10) Patent No.: US 12,397,928 B2
(45) Date of Patent: Aug. 26, 2025

(54) METHOD OF MANUFACTURING MONOLITHIC STRUCTURE IN COMPOSITE MATERIAL FOR WINGS OR EMPENNAGES OF AIRCRAFT

(71) Applicant: LEONARDO S.P.A., Rome (IT)

(72) Inventors: Stefano Giuseppe Corvaglia, Grottaglie (IT); Nicola Gallo, Grottaglie (IT); Antonio Baroni, Grottaglie (IT); Alfredo Ricciardi, Grottaglie (IT)

(73) Assignee: LEONARDO S.P.A., Rome (IT)

( * ) Notice: Subject to any disclaimer, the term of this patent is extended or adjusted under 35 U.S.C. 154(b) by 236 days.

(21) Appl. No.: 18/270,112

(22) PCT Filed: Dec. 23, 2021

(86) PCT No.: PCT/IB2021/062260
§ 371 (c)(1),
(2) Date: Jun. 28, 2023

(87) PCT Pub. No.: WO2022/144723
PCT Pub. Date: Jul. 7, 2022

(65) Prior Publication Data
US 2024/0067359 A1     Feb. 29, 2024

(30) Foreign Application Priority Data
Jan. 4, 2021   (IT) .................. 102021000000044

(51) Int. Cl.
*B64F 5/10*       (2017.01)
*B29C 70/00*     (2006.01)
(Continued)

(52) U.S. Cl.
CPC .............. *B64F 5/10* (2017.01); *B29C 70/003* (2021.05); *B29C 70/30* (2013.01); *B29C 70/682* (2013.01);
(Continued)

(58) Field of Classification Search
CPC ........................ B64F 5/10; B29L 2031/3085
See application file for complete search history.

(56) References Cited

U.S. PATENT DOCUMENTS

| 3,795,559 A | * | 3/1974 | Horn et al. ............... | B64C 1/36 156/173 |
| 5,332,178 A | * | 7/1994 | Williams .............. | B29C 70/446 244/133 |

(Continued)

FOREIGN PATENT DOCUMENTS

EP    0396965 A1 * 11/1990

OTHER PUBLICATIONS

International Search Report and Written Opinion in corresponding International Patent Application No. PCT/IB2021/062260, mailed Apr. 22, 2022 (15 pages).

*Primary Examiner* — Jeffry H Aftergut
(74) *Attorney, Agent, or Firm* — Leason Ellis LLP

(57) ABSTRACT

The invention relates to a monolithic structure in composite material manufactured starting from a fiber-reinforced prepreg material and comprises two walls facing each other and at least one interconnection element extending transversely between the walls, connected to them and delimiting with the latter respective elongated cavities; wherein the walls extend symmetrically at opposite sides of a direction; the interconnection element is a rib extending transversely to the aforesaid direction; at least one wall has a sandwich configuration and comprises two panels facing each other and at least one spar member, which extends transversely between the panels, is connected to them, delimits with the latter respective elongated cavities and extends transversally to the rib.

10 Claims, 11 Drawing Sheets

(51) Int. Cl.
*B29C 70/30* (2006.01)
*B29C 70/68* (2006.01)
*B29K 25/00* (2006.01)
*B29K 105/08* (2006.01)
*B29L 31/30* (2006.01)
*B64C 3/20* (2006.01)

(52) U.S. Cl.
CPC .... *B29K 2025/06* (2013.01); *B29K 2105/089* (2013.01); *B29L 2031/3085* (2013.01); *B64C 3/20* (2013.01)

(56) References Cited

U.S. PATENT DOCUMENTS

| | | | | |
|---|---|---|---|---|
| 6,151,743 | A | * | 11/2000 | Church .................. B29C 70/48 52/783.17 |
| 6,655,633 | B1 | * | 12/2003 | Chapman, Jr. ........ B29C 53/821 244/133 |
| 7,063,763 | B2 | * | 6/2006 | Chapman, Jr. ............ B64C 1/06 156/169 |
| 2017/0174313 | A1 | | 6/2017 | Brakes |

* cited by examiner

METHOD OF MANUFACTURING MONOLITHIC STRUCTURE IN COMPOSITE MATERIAL FOR WINGS OR EMPENNAGES OF AIRCRAFT

CROSS-REFERENCE TO RELATED APPLICATIONS

This patent application is a U.S. National Phase Application under 35 U.S.C. § 371 of International Patent Application No. PCT/IB2021/062260, filed on Dec. 23, 2021, which claims priority from Italian patent application no. 102021000000044, filed on Jan. 4, 2021, all of which are incorporated by reference, as if expressly set forth in their respective entireties.

TECHNICAL SECTOR

The present invention relates to a method of manufacturing a monolithic structure in composite material for wings or empennages of aircraft, in particular for aeroplanes, to which the following description will explicitly refer without losing generality.

BACKGROUND ART

As is well known, wings or empennages are structural components with fixed surfaces that are part of an aircraft and that internally integrate a structure in composite material that has appropriate cavities to reduce the weight thereof.

In particular, the term "wing" means a component of an aircraft or of an aeroplane, the surface or surfaces of which is/are arranged according to a certain attitude with respect to the fluid current flowing over it, and which is capable of generating a series of fluid-dynamic actions (resultant of forces and moments) caused by complex physical mechanisms linked to local variations in speed, pressure and viscous actions, acting on the surface or surfaces itself/themselves.

The empennages are those parts of an aeroplane or of an aircraft with stabilising functions and comprise one or more horizontal planes and one or more vertical planes. The horizontal planes often consist of a fixed part, the stabiliser, and of a moving part, the balancer, hinged at the rear of the stabiliser. In some cases the horizontal plane is formed by a single surface, the stabilator (contraction of stabiliser and balancer). The vertical planes also consist of two surfaces, one fixed, the tail fin, and one movable, the rudder, although in some cases of high-performance aeroplanes (military and aerobatic) there are fully movable vertical empennages.

It is also known that wings and empennages in the aeroplanes frequently have a tapered pattern from the root, i.e. the area connected to the fuselage, to the free end.

In other words, having identified as the longitudinal direction of extension of the wing or empennage the direction that connects the median zone of the root to the median zone of the free end and as chords the imaginary segments that extend transversally to the aforesaid longitudinal direction and that join the wind leading edge with the wind trailing edge of the wing or empennage themselves, it is possible to observe how the aforesaid chords decrease in length as one moves away from the fuselage towards the free end of the aforesaid wing or empennage.

As specified above, both the wings and the empennages of known type have internally a structure manufactured in composite material and essentially comprising:
a first wall;
a lower wall facing the first wall and arranged spaced from the latter by a non-zero amount; and
a plurality of interconnection elements extending between the first and second wall and delimiting between them and with the aforesaid walls respective elongated through cavities.

The use of the composite material allows to reduce the overall weight of the aeroplanes and to obtain at the same time very strong structures.

The first and second wall of the structures of known type are approximately parallel and more precisely slightly convergent with each other towards the free end of the wing or empennage.

The interconnection elements are defined by spar members extending transversely to the chords of the wing or empennage and in respective directions joining the root to the free end of the wing or empennage themselves.

More precisely, the spar members generally consist of partitions that are substantially orthogonal, or more generally transverse, to the walls of the structure.

The structure described is manufactured using a known method which comprises the steps indicated below starting from a prepreg with a thermosetting matrix (resin) reinforced by fibers of different nature such as carbon fibers, aramidic fibers, glass fibers, etc.

First of all, each spar member, in the prepreg condition, is preformed on suitable preforming tools, making two elongated profiled elements having C-sections and consisting of a back and two flanges projecting orthogonally from the opposite end edges of the back; in order to form a spar member, the two C-shaped profiled elements are joined together along their respective backs so as to present the opposing concavities.

In particular, each C-shaped profiled element is laminated on three flat faces of a preforming tool with a substantially parallelepiped profile; a first face of the tool is completely coated by the prepreg, while two other faces adjacent to the first face, orthogonal to the latter and parallel to each other, are coated only for a stretch.

After the necessary vacuum consolidation and at a predetermined temperature, the C-shaped profiled elements are joined two by two in the manner described above so as to form the desired number of spar members, which are held in position and at the predetermined distance for the subsequent step of curing by respective rigid support tools having the shape of elongated pins.

The preforming operation is a vacuum and temperature application process that allows the prepreg material to acquire a consolidated shape without undergoing a polymerization process.

Each support tool is constituted by a substantially parallelepiped, rigid and solid elongated body, delimited by flat faces and having a cross section corresponding to the shape of the elongated cavities of the structure to be manufactured.

Before positioning each spar member, still in the form of a preformed prepreg, between two support tools, the latter are subjected to a dressing operation consisting of the following successive steps:
applying a layer of separating agent, for example in the form of a film, to each support tool to facilitate the subsequent extraction of the support tool itself from the respective elongated cavity;
fitting on each support tool thus prepared a tubular bag leaving an excess of the latter at each end of the support tool itself for a subsequent sealing operation;

wrapping on each support tool and outside the tubular bag a ventilation fabric, fixing the flaps thereof with a sealant;

fitting on each support tool thus prepared a tubular separator film, leaving also in this case an excess of the latter at each end of the support tool itself for the subsequent sealing operation;

sealing the ends of the tubular bag and of the tubular separator film by means of a sealant;

applying the vacuum and waiting for the tubular separator film to shrink the entire dressing on the relative support tool.

At this point, the preformed spar members, each constituted by two C-shaped profiled elements joined together along the respective backs, are positioned between the support tools previously subjected to the above-described dressing operation; in particular, each preformed spar is arranged so that:

the backs of the relative pair of C-shaped profiled elements that constitute it are interposed between two facing flat faces of two mutually adjacent support tools; and the wings of each profiled element rest on respective flat faces of the relative support tool, parallel to each other and substantially orthogonal to the flat face that supports the back of the profiled element itself.

The assembly thus formed constituted by the preformed spar members and the previously dressed support tools is inserted in a forming mold including a lower plate, an upper plate and two opposite side walls connecting the lower and upper plates.

In particular, on each of the two upper and lower plates one or more layers of prepreg material are laminated which are destined to define a first and a second skin which will constitute, after the curing step, the first and the second wall of the structure to be manufactured.

More precisely, on the lower plate of the forming mold carrying the first skin, the preformed spar members held in position by the respective support tools are positioned; subsequently, the upper plate of the forming mold carrying the second skin is closed on the side walls of the mold itself and on the assembly constituted by the preformed spar members and the support tools.

At this point, a separator film, a ventilation fabric and a bag film are arranged in succession on the entire forming mold; the bag film is sealed by means of sealant at the base of the forming mold.

The tubular separator film arranged on each support tool is opened at its ends; the part in excess in length with respect to the relative support tool is cut.

The tubular bags on the respective support tools are unwound at the ends and sealed.

The so-called envelope bag is thus formed, by sealing the edge of the external bag film arranged on the forming mold with the ends of the tubular bags of the support tools and also by sealing the ends of the adjoining tubular bags.

At this point the vacuum is applied inside the envelope bag until the material of the external bag is shrunk toward the external surface of the forming mold.

The ends of the tubular bags are then opened and, by continuing to apply the vacuum, the tubular bags themselves are detached from the respective support tools, tending to minimize the volume enclosed inside the envelope bag.

At this point the support tools are extracted and the assembly thus formed is brought to autoclave to carry out the curing operation at given pressure and temperature values (for example for epoxy resins, the curing temperature is about 180° C. and the curing pressure is between 6 and 7 bar).

The method described and the tools used allow to correctly position the preforms and to maintain their position during the closing operations of the mold for forming and manufacturing the envelope bag.

The extraction of the support tools before the curing cycle prevents the tools, under the conditions of pressure and temperature necessary for the curing, from being deformed in an inadequate way so as to ensure the uniform application of the pressure on all the parts in composite material.

The tubular bags instead allow a uniform application of the pressure on the composite parts that they contact.

However, the Applicant noted that the described structure and the method for obtaining it are susceptible of improvements.

In particular, in the multi-spar structure of known type analysed in detail in the preceding pages, the external loads are distributed between the two skins that define the first and the second wall and between the various spar members; the wing or the empennage having this type of structure, while being perfectly functional to the final use, performs better technically in terms of bending than torsion.

There is therefore a need in the industry for manufacturing wings and empennages that, while exhibiting the same behaviour as known wings and empennages with respect to flexural loads, have a better response to torsional loads during operation.

In addition, there is also a need in the industry to simplify the method of manufacturing the structures for wings or empennages in order to make it more efficient and less costly; finally, the quality of the finish of the surfaces, in particular those inside the structure, requires further improvements.

US 2017/0174313 A1 describes a method of manufacturing structures in composite material for wings of aircraft. This method uses two skins in uncured composite material wrapped into a ring around an assembly of support tools placed side by side and parallel to each other; uncured composite material destined to define respective ribs of the wing is interposed between each pair of support tools. The method also provides for the use of preformed reinforcing structures inserted in certain positions between the two skins and having a sufficient cross-linking degree to avoid using support elements during the final curing step. The components of the preformed reinforcing structures are therefore manufactured at a different time from that in which the skins and ribs are manufactured, thus making the method long and complex. Adhesives or other fixing systems must be used to join preformed and at least partially cross-linked reinforcing structure and uncured skins. The structure obtained cannot therefore be said to be monolithic, i.e. obtained in one go with prepreg material identical in every part and having the same condition before the curing step.

OBJECT AND SUMMARY OF THE INVENTION

Aim of the present invention to provide a method of manufacturing a monolithic structure in composite material for wings or empennages of aircraft, which is highly reliable and of limited cost and allows to satisfy at least one of the requirements specified above and connected with the methods of manufacturing monolithic structures in composite material of known type.

According to the invention, this aim is achieved by a method of manufacturing a monolithic structure in composite material for wings or empennages of aircraft as claimed in claim 1.

BRIEF DESCRIPTION OF THE DRAWINGS

For a better understanding of the present invention, a preferred non-limiting embodiment is described below, purely by way of example and with the aid of the attached drawings, wherein.

DETAILED DESCRIPTION

Figure 1:
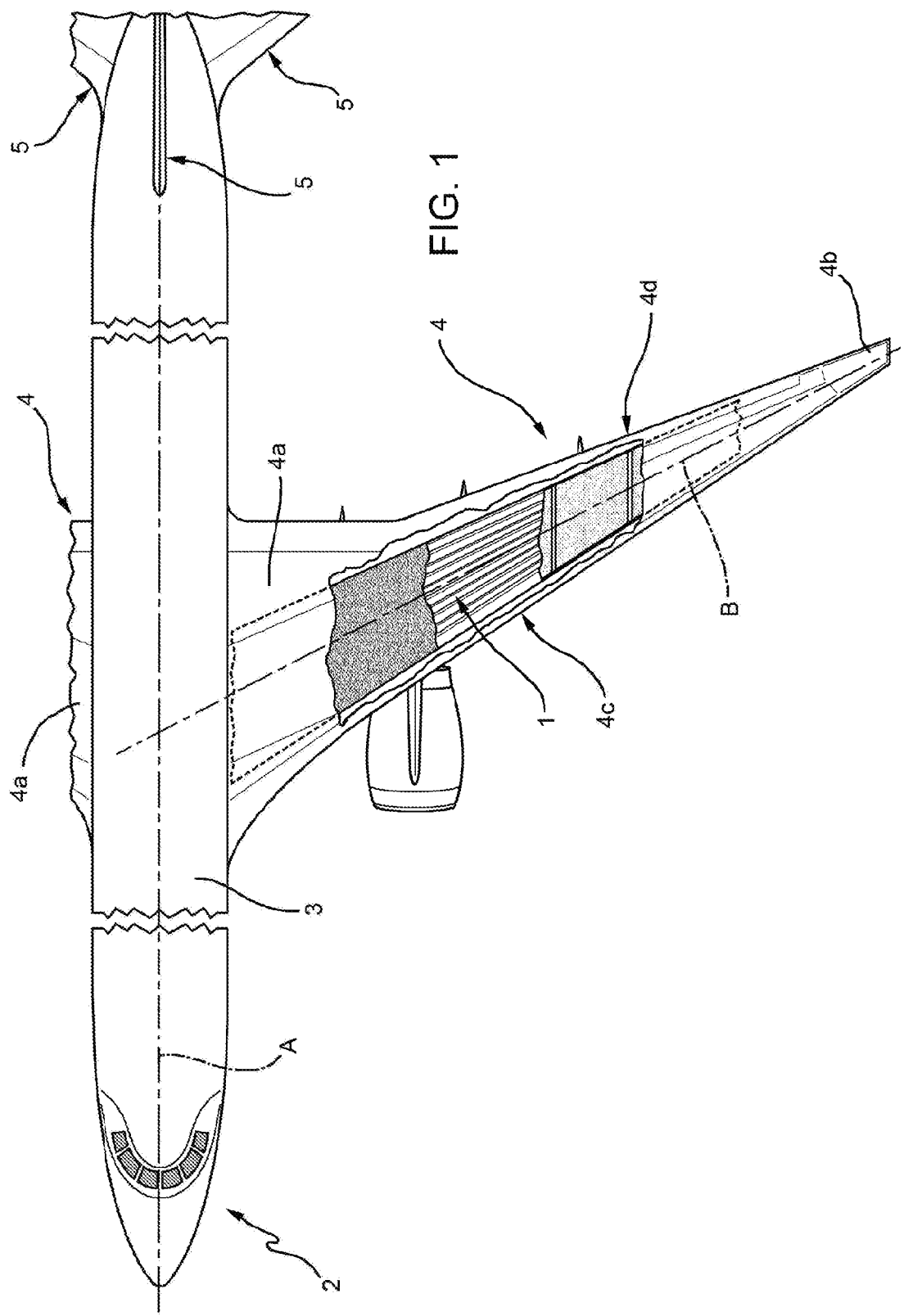
FIG. 1 is a top view, with parts removed for clarity's sake, of an aircraft incorporating within its wing a monolithic structure in composite material manufactured according to the method of the present invention.
Figure 2:
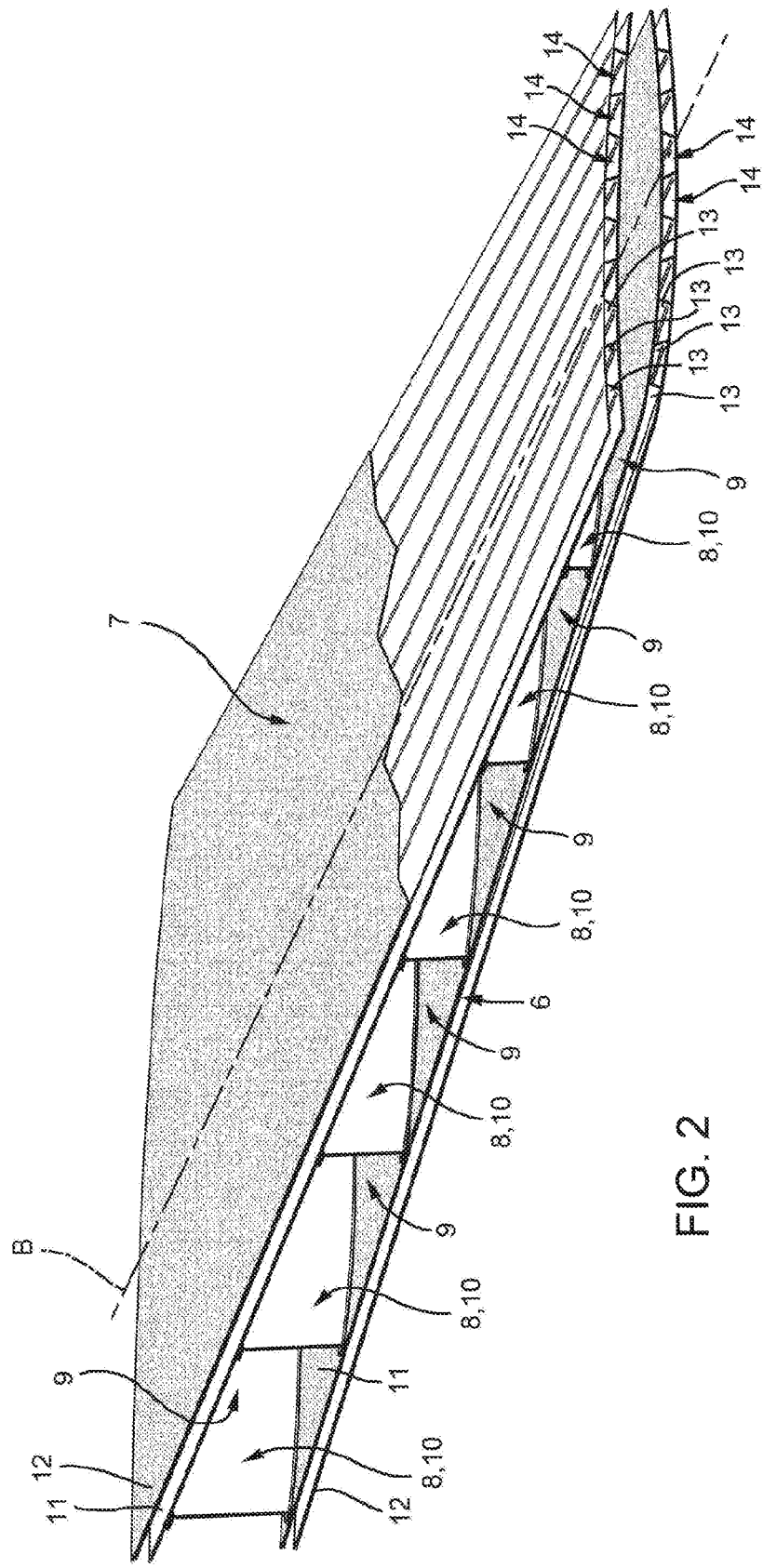
FIG. 2 shows a perspective view, on enlarged scale, with parts removed for clarity's sake, of the monolithic structure of FIG. 1.

With reference to FIGS. 1 and 2, 1 denotes as a whole a monolithic structure in composite material for an aircraft, that is, for a vehicle capable of flying at least for short distances.

In the example shown in FIG. 1, the represented aircraft is an aeroplane 2 comprising in a known manner a fuselage 3, two wings 4 and a plurality of tail empennages 5, among which a tail fin and two stabilisers are partially visible.

The aeroplane 2 has an axis A coinciding with the axis of the fuselage 3 and with the forward direction of the aeroplane 2 itself; the wings 4 and the empennages 5 extend cantilevered starting from the fuselage 3.

In more detail, each wing 4 has a root portion 4a, connected to the fuselage 3, and a free end portion 4b, opposite the root portion 4a itself.

Each wing 4 therefore extends along a longitudinal direction B identified as the junction that joins the median zone of the root portion 4a to the median zone of the free end portion 4b. The direction B of longitudinal extension of each wing 4 is arranged transversely to the axis A of the aeroplane 2 and, in the case bevelled, forms an obtuse angle with the axis A itself towards the front part of the fuselage 3. Alternatively, the direction B could also form an acute or right angle with the axis A.

Each wing 4 is further delimited, transversely to the direction B, by a wind leading edge 4c and by a wind trailing edge 4d; in each wing 4, the leading edge 4c is arranged in front of the trailing edge 4d with reference to the forward travel direction of the aeroplane 2.

In the case shown, each wing 4 presents a tapered pattern along the direction B starting from the root portion 4a and proceeding towards the free end portion 4b; in practice, having identified as chords the imaginary segments that extend transversally to the direction B and that join the leading edge 4c with the trailing edge 4d of each wing 4, it is possible to note that, in the case shown, the aforesaid chords decrease in length as one moves away from the fuselage 3 towards the free end portion 4b of the wing 4 itself.

As can be seen in the example shown in FIG. 1, the structure 1 constitutes the internal part of each of the wings 4.

It should be noted that the structure 1 could also be used for each of the empennages 5 of the aeroplane 2 or for wings or empennages of aircraft in general.

With reference to FIGS. 1 to 5, the structure 1 comprises:
- a first wall 6;
- a second wall 7 facing, along its own surface of greatest extension, a surface of greatest extension of the wall 6 and arranged spaced from the latter by a non-zero amount; and
- a plurality of interconnection elements 8 extending transversely between the walls 6 and 7, connected to them and delimiting with the walls 6 and 7 themselves respective elongated cavities 9.

In the case shown, the wall 6 defines the lower wall of the structure 1 in the position of use of the relative wing 4, while the wall 7 defines the upper wall of the structure 1 itself.

The walls 6 and 7 extend symmetrically on opposite sides of the longitudinal direction B and are approximately parallel to the direction B itself.

The interconnection elements 8 are constituted by ribs 10 extending transversely to the longitudinal direction B.

Each wall 6, 7 has a "sandwich" structure comprising:
- a first panel 11, facing, along its own surface of greatest extension, a surface of greatest extension of the other wall 7, 6;
- a second panel 12 facing, along its surface of greatest extension, the surface of greatest extension of the panel 11; and
- a plurality of spar members 13, which extend transversely between the panels 11 and 12, are connected to them, delimit with the panels 11, 12 themselves respective elongated cavities 14 and extend transversely to the ribs 10.

In practice, the panels 11 of the walls 6 and 7 are facing each other and interposed, or arranged more internally, between the panels 12 in a direction transversal to the panels 11, 12 themselves.

The panels 11, and likewise the panels 12, extend symmetrically on opposite sides of the longitudinal direction B and are approximately parallel to the direction B itself.

According to a possible alternative not shown, only one of the walls 6 and 7 could have a sandwich structure, while the other could simply be formed by a single panel.

In the case shown, the distance between the panels 11 and 12 of each wall 6, 7 is smaller than the distance between the panels 11 in the direction transversal to the panels 11, 12 themselves.

In the case of the alternative in which only one of the walls 6 and 7 has the above-described sandwich structure while the other is formed by a single panel, the distance between the panels 11 and 12 of the wall 6, 7 having a sandwich structure is smaller than the distance of the panel 11 from the wall 7, 6 formed by a single panel.

The panels 11 and 12 and, more generally, the walls 6 and 7 are, in the case shown, slightly convergent with each other towards the free end portion 4b of the wing 4. According to a possible alternative not shown, the panels 11 and 12 and more generally the walls 6 and 7 could also be parallel to each other.

In all cases, the panels 11 and 12 and more generally the walls 6 and 7 can be considered to be approximately parallel to each other.

The ribs 10 and the spar members 13 can have open or closed cross sections.

Figure 3:
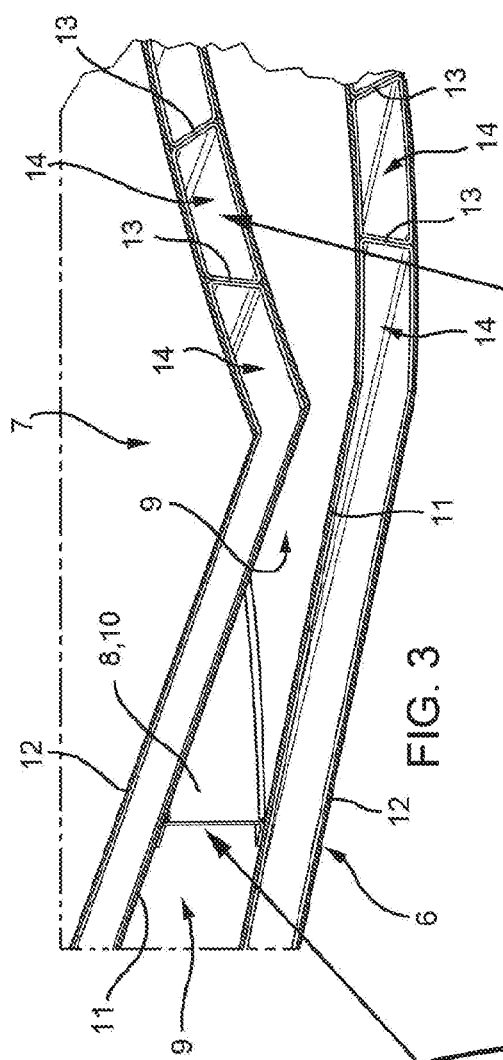
FIG. 3 a partially sectioned perspective view on an enlarged scale of a detail of the monolithic structure of FIG. 2.
Figure 4:
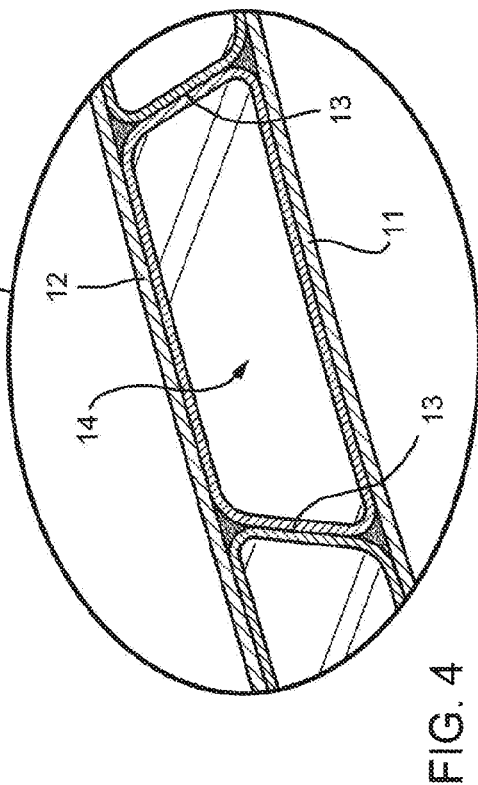
FIGS. 4 and 5 are partially sectioned perspective views and on a further enlarged scale of respective details of the detail of FIG. 3.
Figure 5:
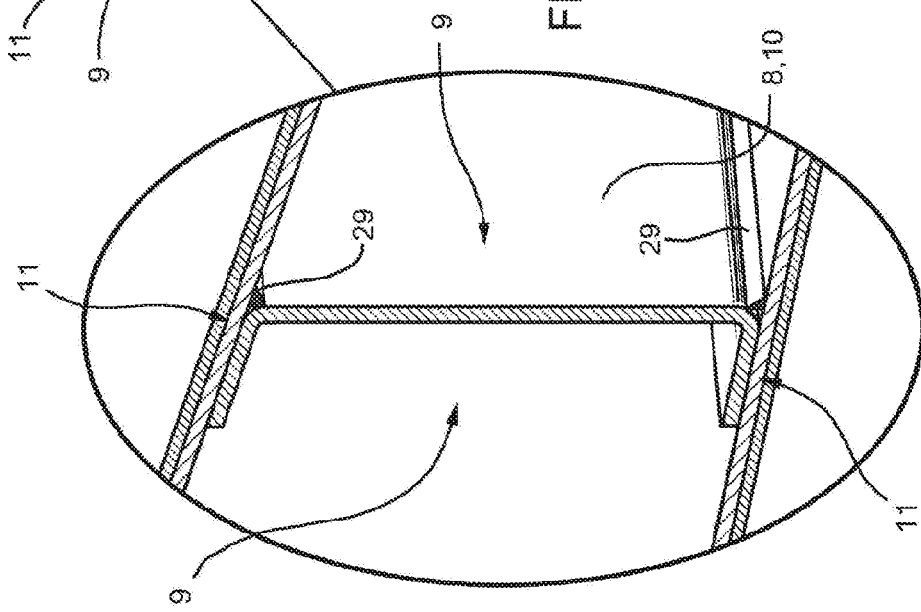
Figure 6:
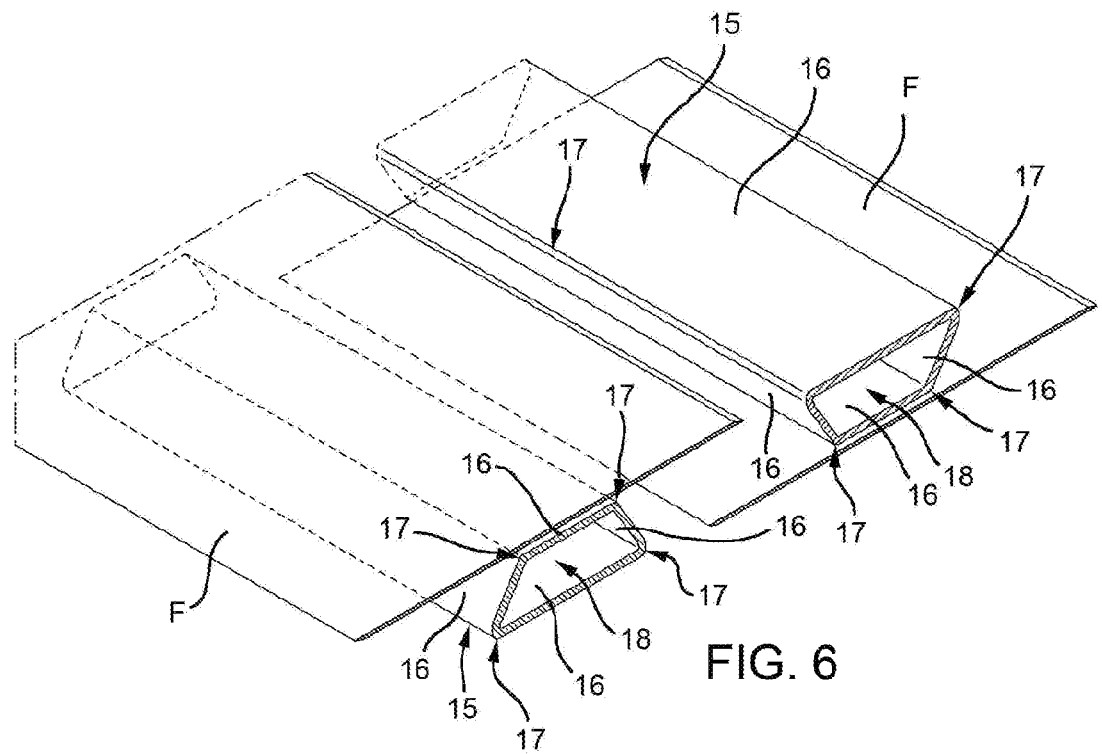
FIGS. 6 to 9 show a partially sectioned perspective view of first support tools in successive steps during a forming and laminating operation of respective walls of the monolithic structure of FIG. 2 by means of prepreg composite material.
Figure 7:
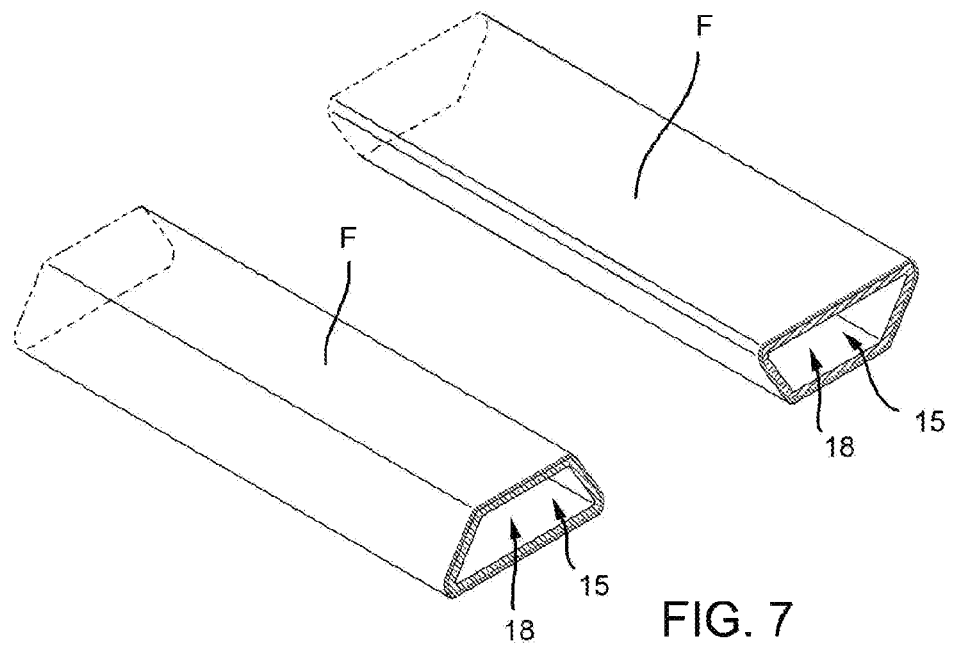

In the solution shown in FIGS. 2, 3 and 5, the ribs 10 have a C-shaped cross section. According to other possible alternatives not shown, the ribs 10 could also have cross sections conformed as I, T, double T, double C, Z or otherwise.

In the example shown, the spar members 13 of each wall 6, 7 have oblique I-shaped cross sections converging two by two towards the outermost panel 12. Also in this case, the cross sections of the spar members 13 could be conformed differently, for example as vertical I, C, Z, T, double T, etc.

The structure 1 is manufactured starting from a prepreg with a polymeric matrix, for example made of thermosetting resin, reinforced by fibers which may have different nature, such as for example carbon fibers and/or aramidic fibers and/or glass fibers, etc.

Alternatively, the structure 1 could also be manufactured starting from a matrix prepreg made of thermoplastic resin reinforced by fibers of the type indicated above.

In both cases, the panels 11, 12 are manufactured starting from respective skins 11a, 12a (FIGS. 8, 9, 13, 14, 15), each of which formed by one or more layers of the aforesaid fiber-reinforced prepreg, laminated on respective flat surfaces, as will be described in greater detail below.

With reference to FIGS. 6 to 9, the spar members 13 are obtained by laminating the above defined prepreg material on respective support tools 15 which are elongated in the direction of longitudinal extension of the spar members 13 themselves.

In particular, the support tools 15 are destined to maintain the spar members 13 in the predefined positions within the structure 1 being manufactured and have a composition based on reinforcing material and polymer suitable to allow the passage from a rigid state to a flexible elastomeric state and vice versa in response to heating and cooling, respectively, i.e. in response to a temperature stimulus.

The polymer constituting the support tools 15 is advantageously a shape memory thermosetting or thermoplastic polymer of known type. The polymer may be, for example, an epoxy polymer with shape memory, a cyanate ester polymer with shape memory, a polyurethane polymer with shape memory, a vinyl polymer with shape memory, a polyimide polymer with shape memory, a maleimide polymer with shape memory, or combinations thereof, including copolymers.

Thanks to the properties of the polymer with shape memory, the support tools 15 can recover their original rigid shape despite an extensive repeated use and after numerous heating and cooling cycles, possibly by inserting them into a dedicated reforming tool.

The reinforcing material of the support tools 15 may include one or more elastic fibers.

In particular, the reinforcing material may also contain nylon fibers, lycra fibers, polyester fibers, carbon fibers, glass fibers, aramidic fibers, boron fibers, basalt fibers, polymer fibers, chopped fibers, meshes, three-dimensional fiber preforms, normal weft fabrics, twill fabrics, or other types of fabric and combinations thereof. A suitable commercial example of nylon fibers is the nylon produced by Invista (Wichita, Kans.).

The support tools 15, in some embodiments, may contain two or more different types of reinforcing materials.

Each support tool 15 has an elongated prismatic shape in the direction of extension of the spar members 13 to be formed and a hollow shape in the same direction. In particular, each support tool 15 has a cross section with a polygonal external profile complementary to the profile of the respective cavity 14 to be formed in the relative wall 6, 7 of the structure 1. In the example shown, each support tool 15 has an isosceles trapezoid cross section and is delimited by four side walls 16 joined together by bevelled edges 17. The walls 16 delimit a longitudinal through cavity 18 of the respective support tool 15.

According to a possible alternative not shown, the support tools 15 could also have a parallelepiped section with bevelled edges.

In the example shown, the prepreg material is laminated externally on all the walls 16 of the relative support tool 15 in the rigid state after applying a resin-based adhesive agent (known as "tackifier"), if necessary based on the degree of tackiness of the prepreg material.

Depending on the conformation of the cross section of the spar members 13 to be formed, the coating with the prepreg material could be limited to some of the walls 16 of the relative support tool 15. Furthermore, again depending on the conformation of the cross section of the spar members 13 to be formed, the support tools 15 could have different cross sections, but in any case always complementary to the shape of the cavities 14 to be manufactured between the spar members 13.

Thanks to its rigid state, it is possible to lay one or more prepreg layers on each support tool 15; moreover, thanks to their composition, it may not be necessary to dress the support tools 15 before laminating the prepreg material.

After the prepreg material has been laid on the walls 16 of each support tool 15, the latter is enclosed and sealed in an external bag (known per se and not shown) in which the vacuum is then applied in a known manner in order to obtain the compaction of the various layers of the prepreg material itself.

At this point, having removed the external bag mentioned in the preceding paragraph, by approaching or placing together laterally side by side the support tools 15 carrying the compacted laminated prepreg material externally (FIGS. 7 and 8), it is possible to laterally join together two by two the portions of prepreg material that coat the walls 16 defining the oblique sides of the trapezoidal cross sections of the support tools 15 themselves.

Since the flat walls 16 of each support tool 15 are joined by bevelled edges 17, the prepreg material assumes the same external shape as the walls 16 themselves on which it is laid and as the bevelled edge 17 that joins them.

Therefore, a recess 19 is formed between each pair of support tools 15 placed side by side and externally coated with prepreg material and which has an approximately V-shaped cross section. The recesses 19 are filled by respective prepreg filling beads 20 or noodles (FIG. 8) having a profile complementary to that of the recesses 19 themselves.

The assembly thus formed constituted by the support tools 15 placed side by side, by the prepreg material coating them externally and by the filling beads 20 is laid and interposed between the skins 11*a* and 12*a* destined to form the panels 11 and 12 of a relative wall 6 or 7.

Figure 8:
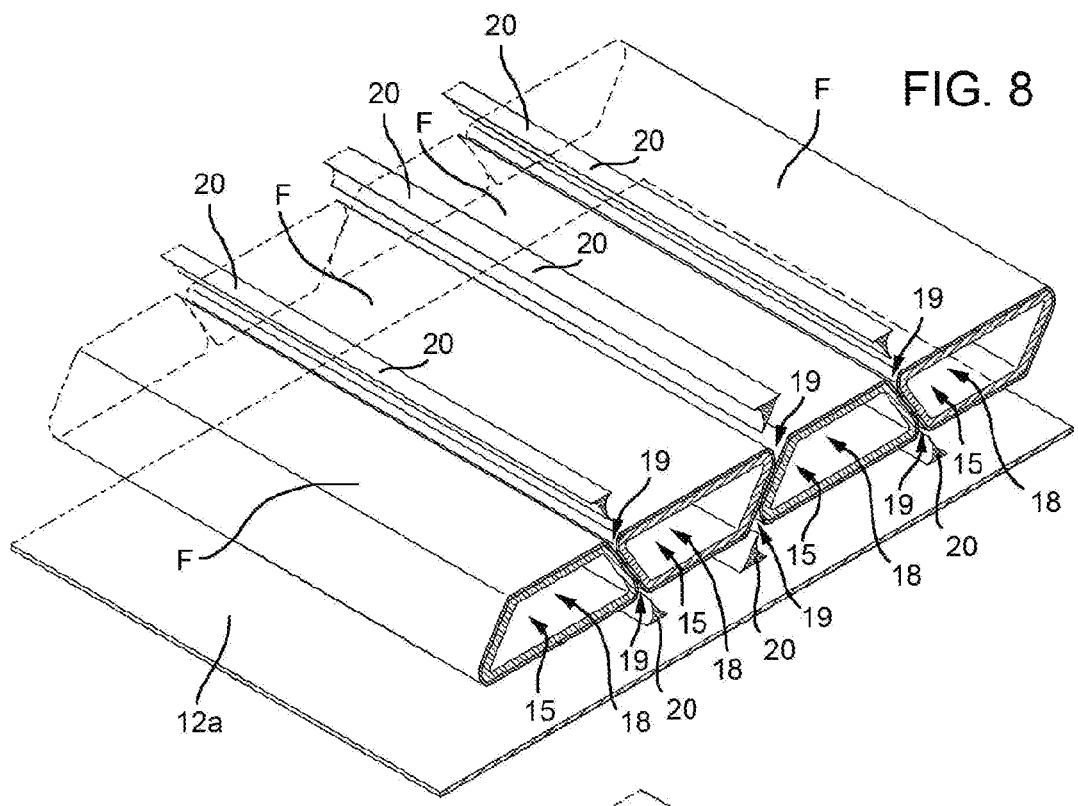
Figure 9:
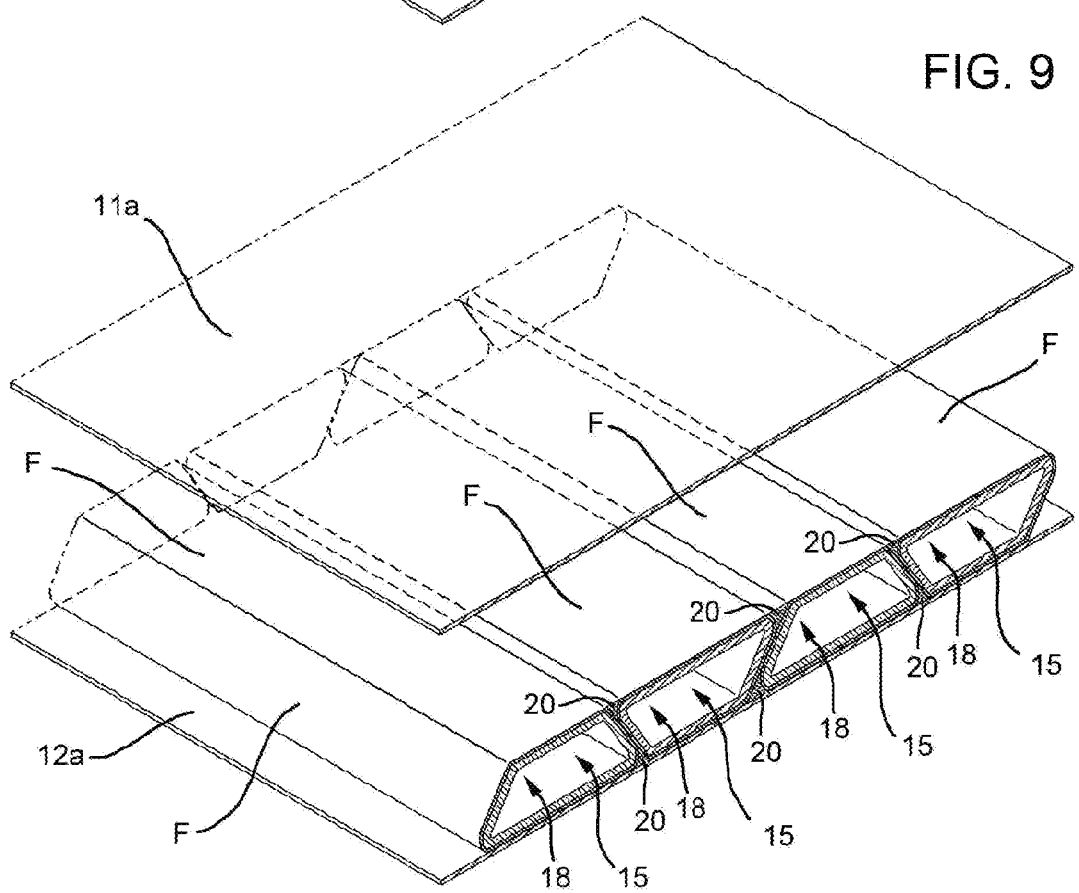

It should be noted that FIGS. 8, 9 show the formation of the wall 6 only, it being understood that the formation of the other wall 7 takes place in a completely similar manner.

In the shown example, the skin 12*a* of the wall 6 is laminated on a forming surface, known per se and not shown. More precisely, a resin-based adhesive agent (known as a "tackifier") is previously applied to the forming surface and then the different layers of prepreg material reinforced with fibers forming the skin 12*a* are laminated.

Preferably, after the lamination of a predetermined number of layers, for example every four layers, a vacuum compaction step is carried out.

At this point, the preformed spar members 13 12*a* and the filling beads 20 held in position by the respective support tools 15 are placed on the skin.

Subsequently, the skin 11*a* (FIG. 9), laminated and compacted in a similar way to that seen for the skin 12*a*, is applied to the assembly thus formed.

Figure 10:
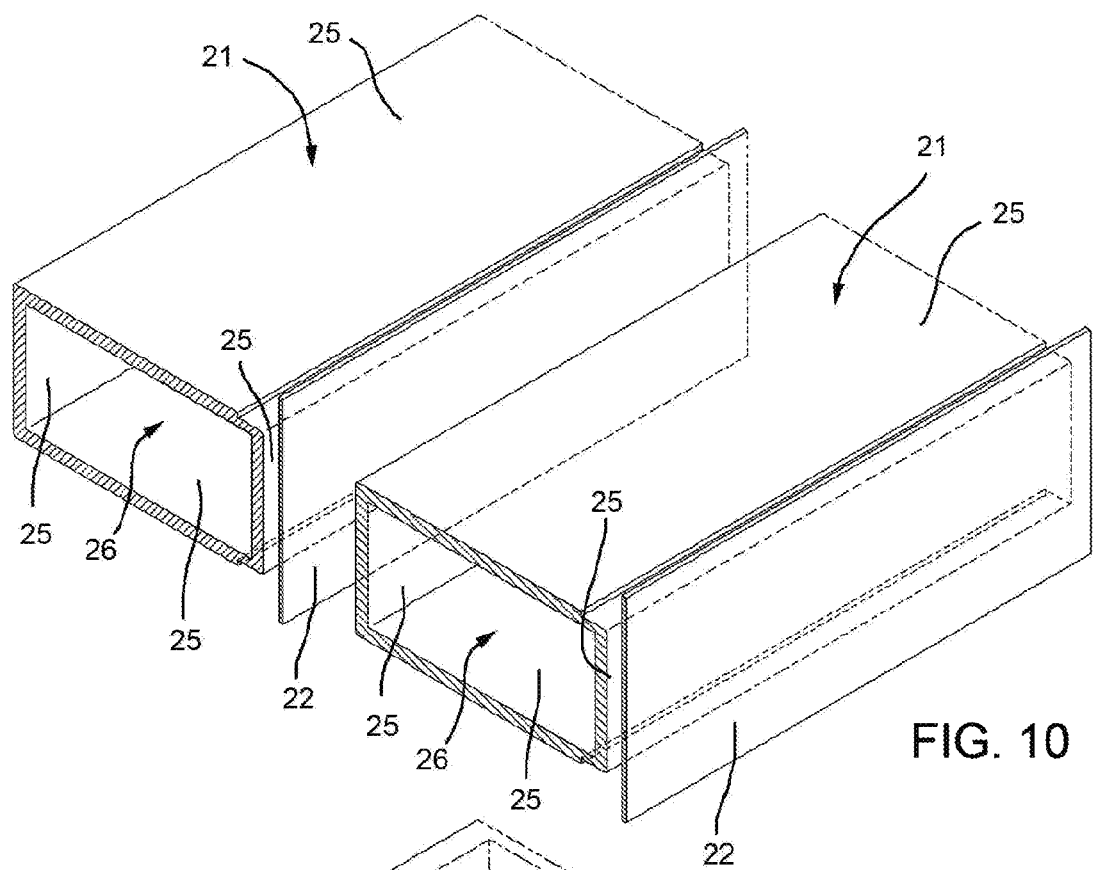
FIGS. 10 to 12 show a partially sectioned perspective view of second support tools in successive steps during a forming and laminating operation of respective interconnection elements of the monolithic structure of FIG. 2 by means of prepreg composite material.
Figure 11:
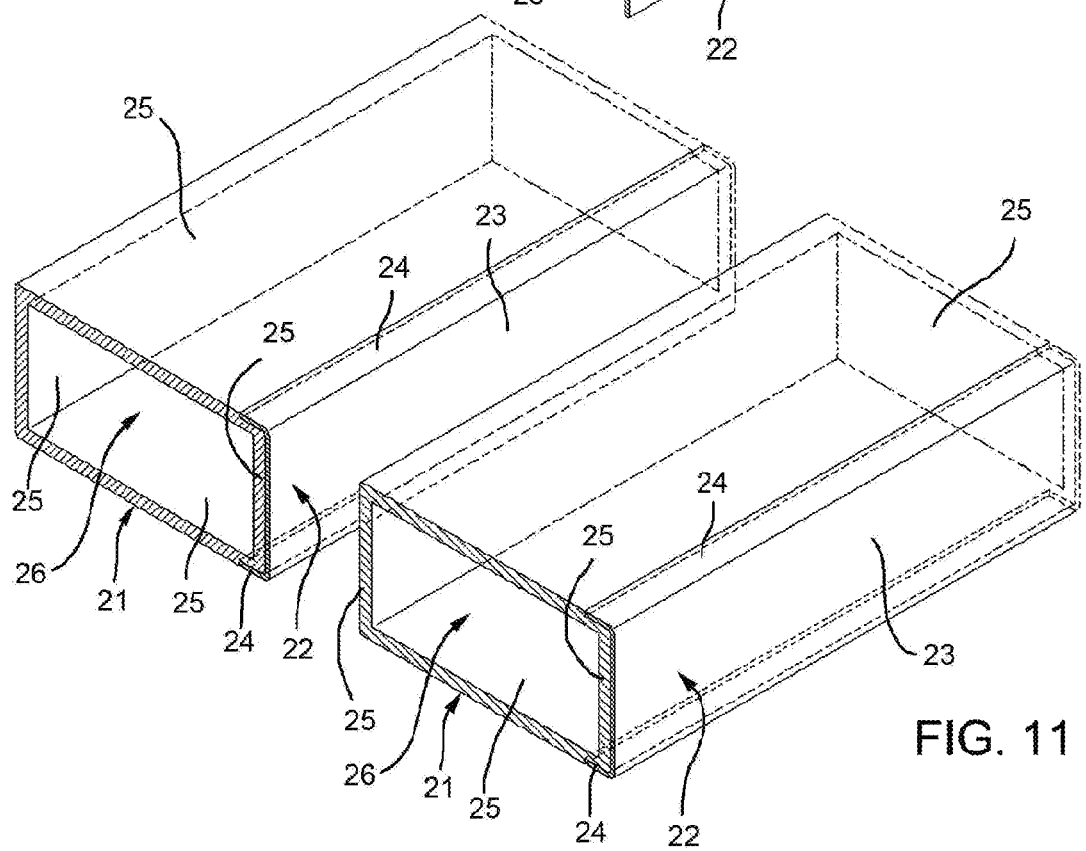
Figure 12:
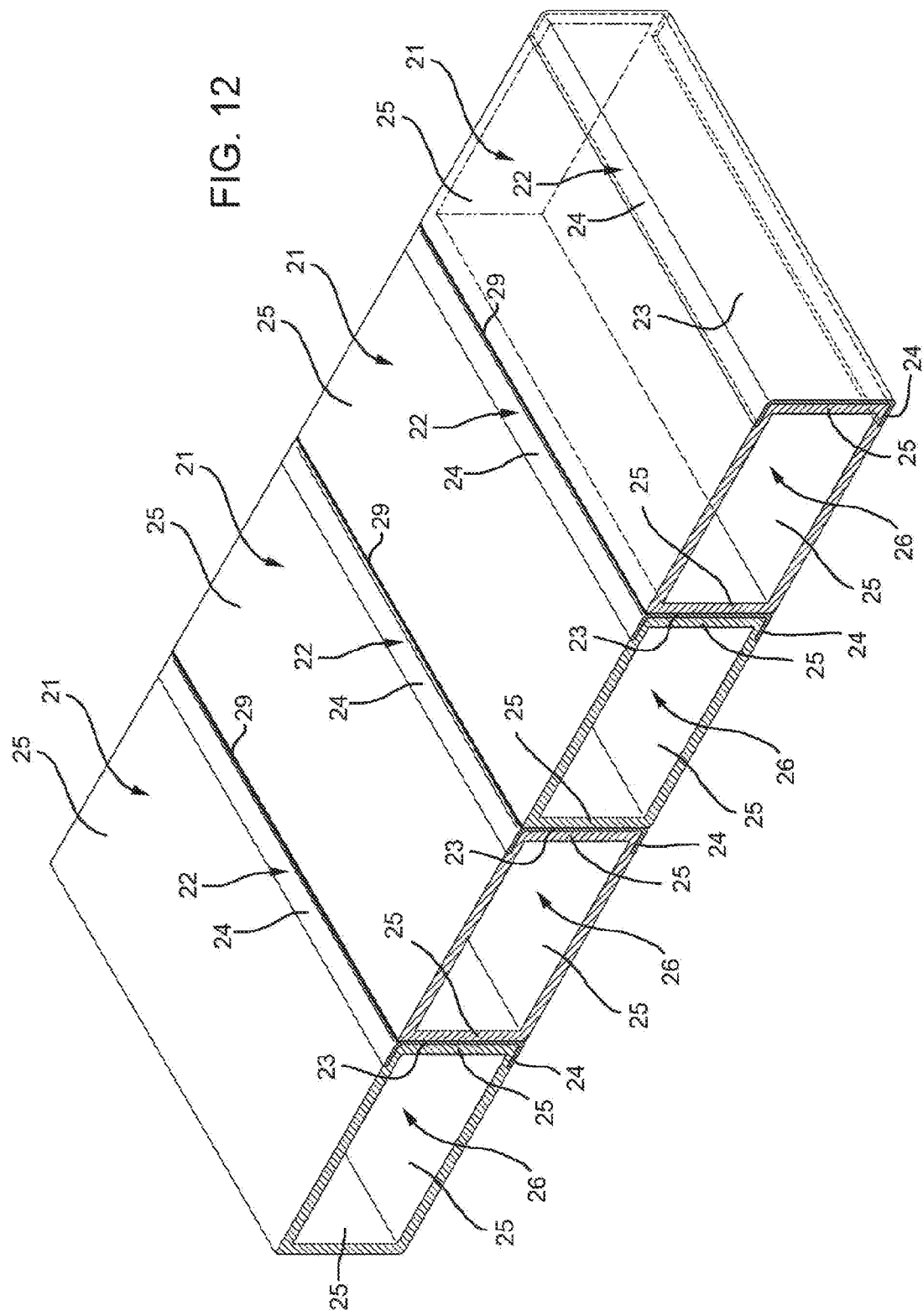

With reference to FIGS. 10 to 12, the ribs 10 are obtained by laminating the above defined prepreg material on further support tools 21 elongated in the main extension direction of the ribs 10 themselves and having the same composition and properties as the support tools 15.

In particular, each rib 10 is obtained starting from a respective elongated profiled element 22, having a C-shaped section and constituted by a main portion 23 that is flat and substantially orthogonal to the skins 11*a* and 12*a* and to the panels 11, 12 and by two end appendages 24 projecting transversely in a substantially orthogonal direction from the opposite end edges of the main portion 23 itself and arranged on the same side of the latter.

Each support tool 21 preferably but not necessarily has a parallelepiped shape elongated in the longitudinal direction of extension of the respective rib 10 and a hollow shape in the same direction. In particular, each support tool 21 has a cross section with a polygonal external profile complementary to the profile of the respective cavity 9 to be formed in the structure 1. In the example shown, each support tool 21 is delimited by four side walls 25 that are parallel two by two and each orthogonal to the two adjacent walls 25.

The walls 25 delimit a longitudinal through cavity 26 of the respective support tool 21.

Each profiled element 22 is laminated externally on three adjoining walls 25 of the relative support tool 21 in the rigid state after application of a resin-based adhesive agent (known as "tackifier").

In particular, a wall 25 of the support tool 21 in the rigid state is completely coated by the prepreg of the relative profiled element 22, while two other walls 25 adjacent thereto are coated only for a predetermined stretch.

Each support tool 21 can therefore support a respective prepreg C-shaped profiled element 22 on one of its sides.

Thanks to its rigid state, it is possible to lay one or more prepreg layers on each support tool 21; moreover, thanks to their composition, it is not necessary to dress the support tools 21 before laminating the profiled elements 22.

After the profiled elements 22 have been laid on the respective walls 25 of each support tool 21, the latter is enclosed and sealed in an external bag (known per se and not shown) in which the vacuum is then applied in a known manner in order to obtain the compaction of the profiled elements 22 themselves.

At this point, by approaching or placing together laterally side by side the support tools 21 carrying externally the respective compacted prepreg profiled elements 22 (FIG. 12), it is possible to keep the latter at the desired distance from each other by means of the support tools 21 themselves. Furthermore, suitable prepreg filling beads 29 or noodles are also inserted at the area between the skins 11*a* and the connection areas between the main portion 22 and the respective end appendages 24.

In particular, each prepreg profiled element 22 is arranged so that:
  the main portion 23 is interposed between two facing walls 25 of two support tools 21 adjacent to each other; and
  the end appendages 24 rest on respective walls 25 of the relative support tool 21, substantially parallel to each other and substantially orthogonal to the wall 25 which supports the main portion 23.

The assembly thus formed, constituted by the prepreg profiled elements 22 and the support tools 21 which hold them in position, is laid on the previously formed skin 11*a* and on the assembly destined to form the wall 6.

Figure 13:
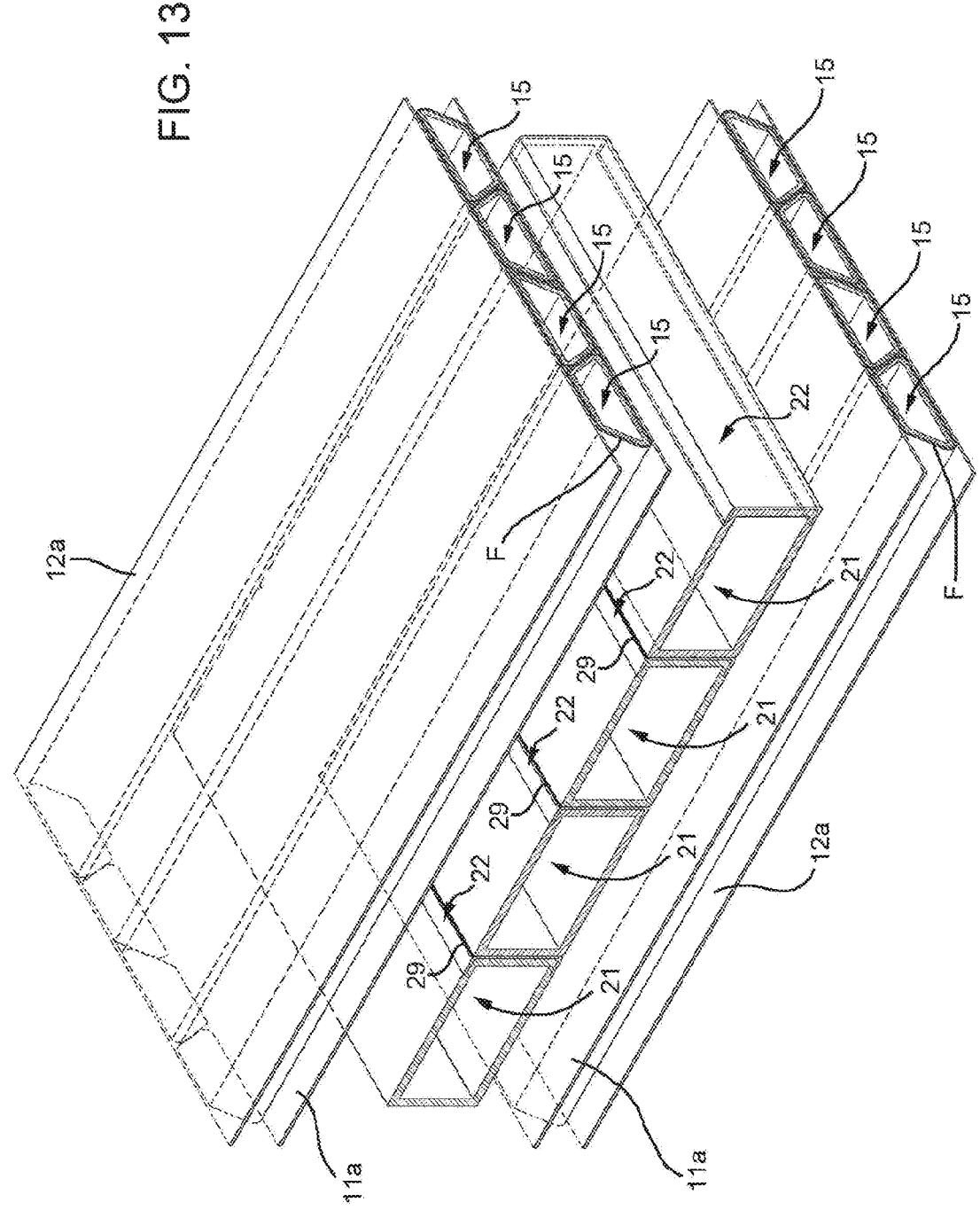
FIGS. 13 to 15 show a partially sectioned perspective view of the monolithic structure of FIG. 2 in successive manufacturing steps by means of the first and second support tools of FIGS. 6 to 12.
Figure 14:
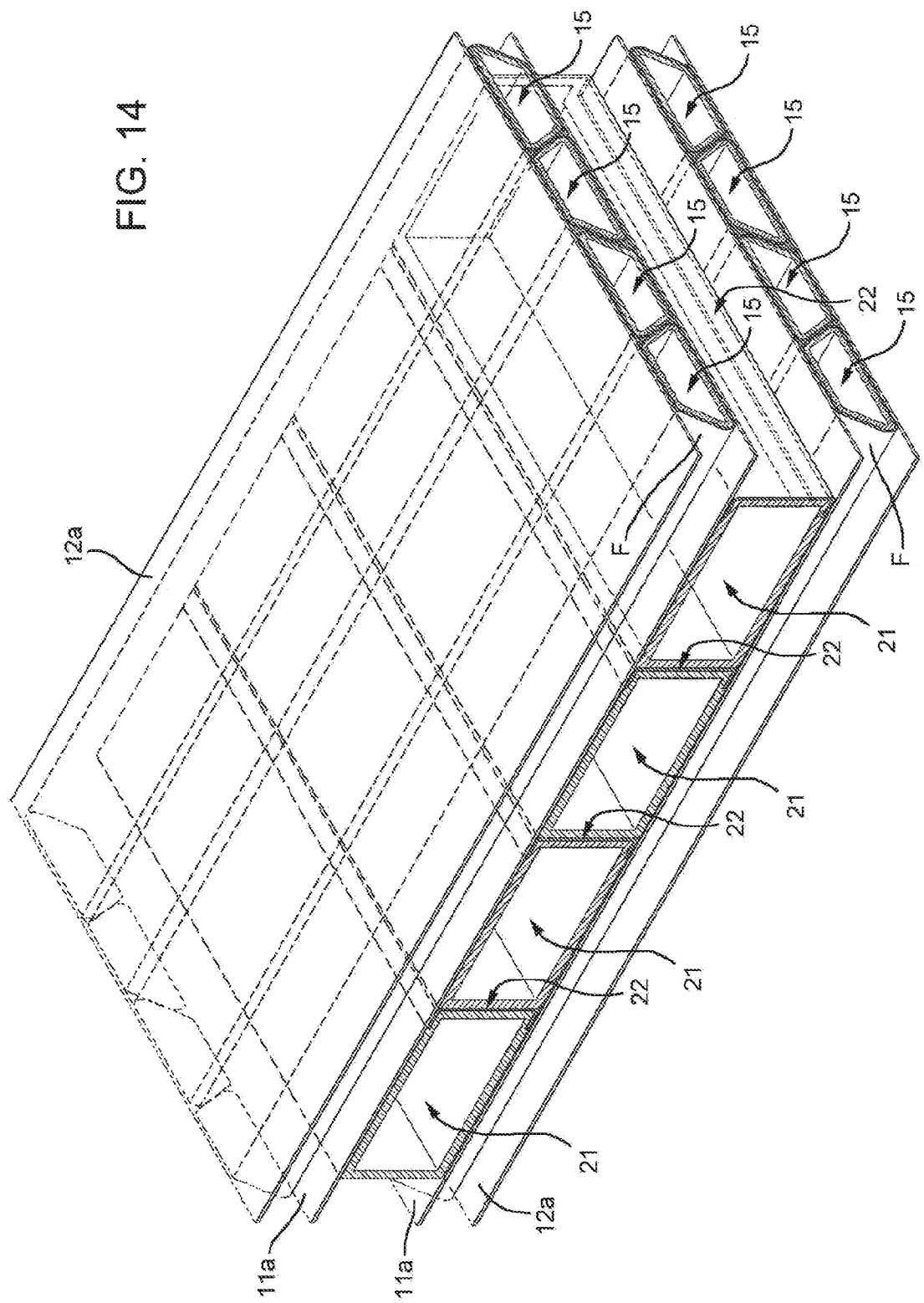

Similarly to what has been seen for the formation of the wall 6, on the assembly defined by the profiled elements 22 and by the support tools 21 the skins 11*a* and 12*a* destined to form the wall 7 are applied with interposition between the skins 11*a*, 12*a* themselves of the pre-formed spar members 13 and of the filling beads 20 held in position by the respective support tools 15 (FIGS. 13 and 14).

The whole is inserted in a forming mold, which is known per se and not shown.

Figure 15:
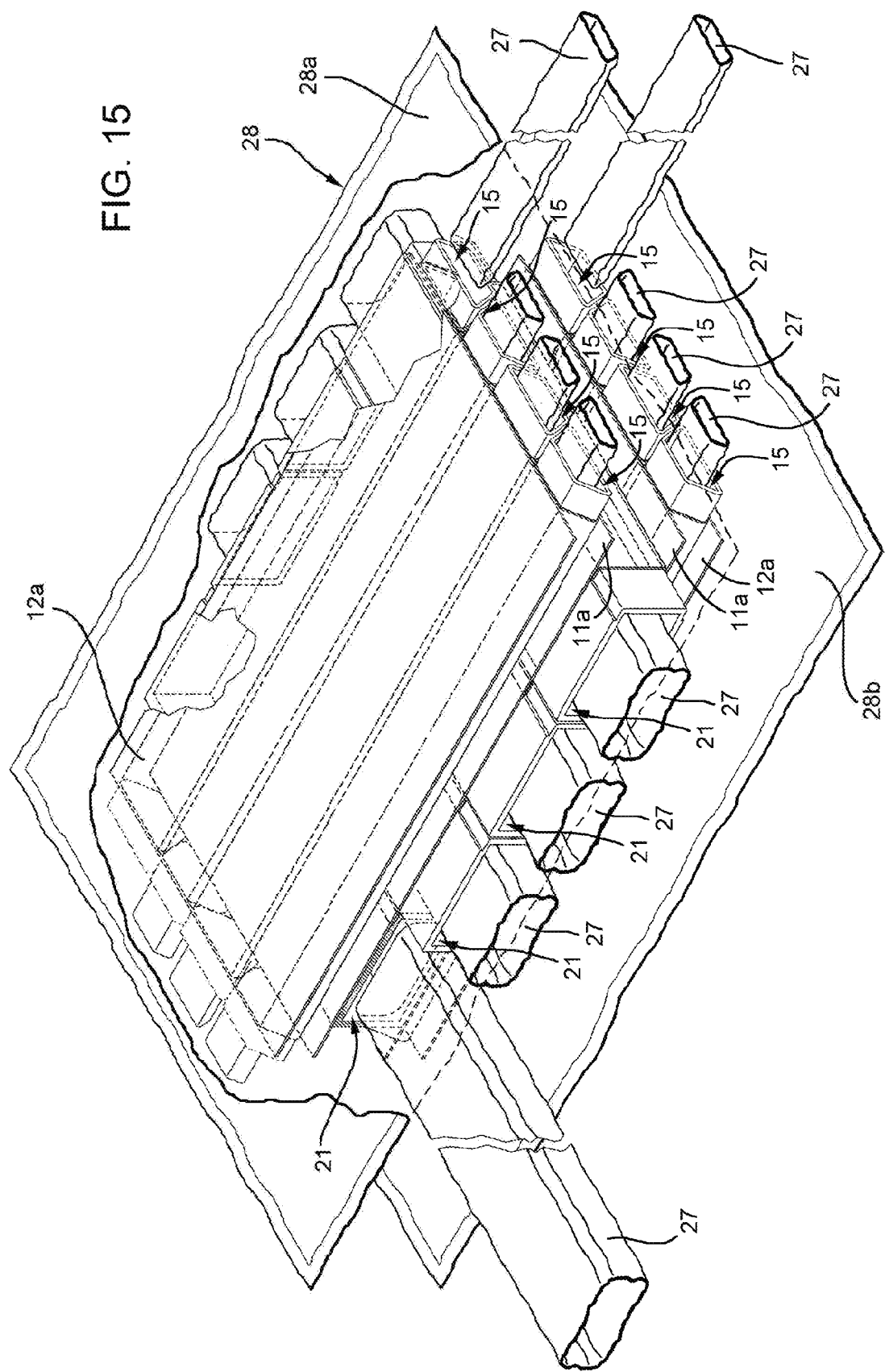

As visible in FIGS. 13 to 15, when mounted to define the structure 1 to be formed, the support tools 15 have prevailing directions of extension transversal to the prevailing directions of extension of the support tools 21.

At this point, a ventilation fabric (known per se and not shown) and a tubular bag 27 projecting at the front and at the rear from the support tool 15, 21 itself are inserted inside each support tool 15, 21 itself (FIG. 15).

According to a possible alternative not shown, the ventilation fabric and the tubular bag 27 could be arranged around each support tool 15, 21.

A further external bag 28, of which two upper and lower flaps 28*a*, 28*b* are visible in FIG. 15, is arranged in use around the previously prepared structure 1 being formed and welded to the projecting ends of the tubular bags 26.

The assembly thus formed, including the support tools 15, the support tools 22, the filling beads 20, the prepreg material arranged around the support tools 15, the profiled elements 22 and the skins 11*a* and 12*a* is brought in a known and non-shown manner into the autoclave to perform the curing operation at predetermined pressure and temperature values (for example, for epoxy resins, the curing temperature is about 180° C. and the curing pressure is between 6 and 7 bar).

During the curing step, the walls 16 and 25 of the support tools 15, 21, due to the temperature stimulus, pass from the rigid state to the flexible elastomeric state. In fact, the support tools 15, 21 are configured to assume the flexible elastomeric state at a temperature below the curing temperature and above 50° C. The curing pressure acts both outside the structure 1 being formed and inside the support tools 15, 21 and therefore inside the cavities 9 and 14 of the structure 1 itself through the tubular bags 26 which thus press on the walls 16, 25 made flexible by the change of state. As a result of the curing pressure, the walls 16, 25 then press uniformly on the prepreg material that polymerizes.

Once the curing step has been completed, the support tools 15, 21 are heated again to pass to the flexible elastomeric state so as to be able to be extracted from the cavities 9, 14 of the structure 1 just formed.

Figure 16:
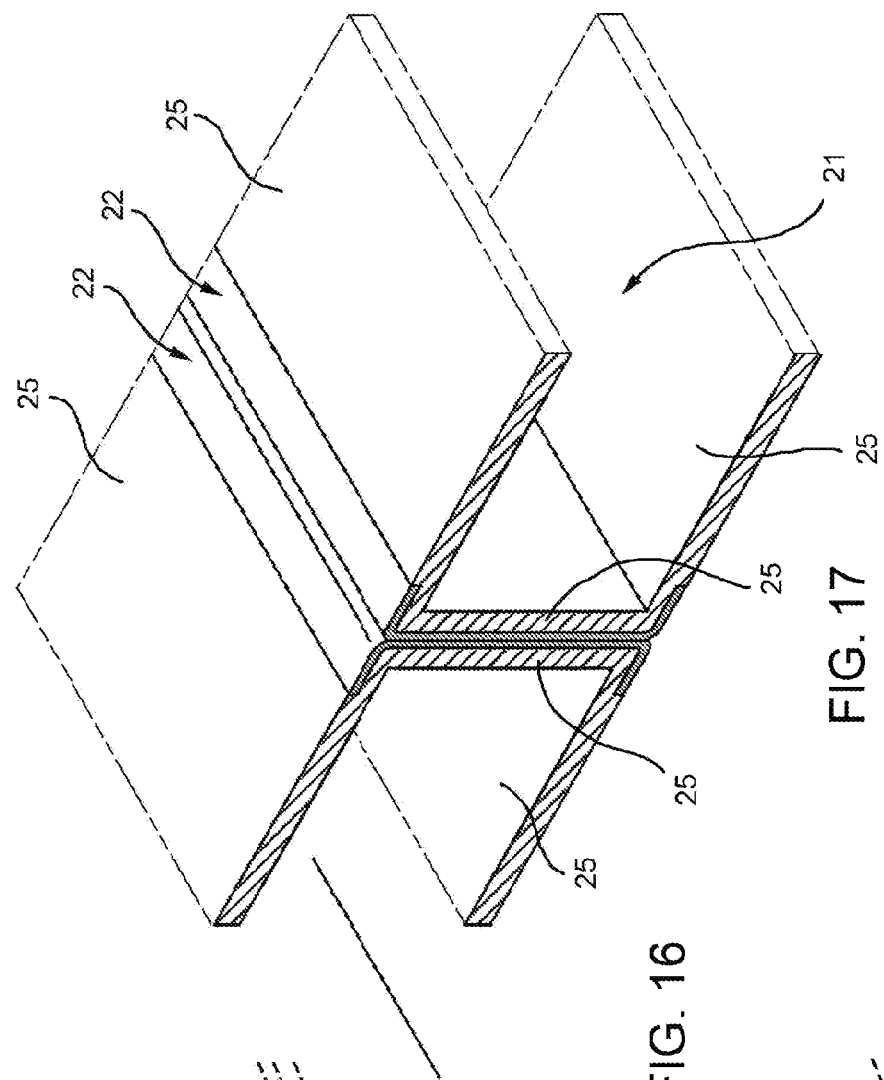
FIG. 16 is a figure similar to FIG. 5 showing in a partially sectioned perspective view a detail of a possible variant of the monolithic box-shaped structure in composite material.
Figure 17:
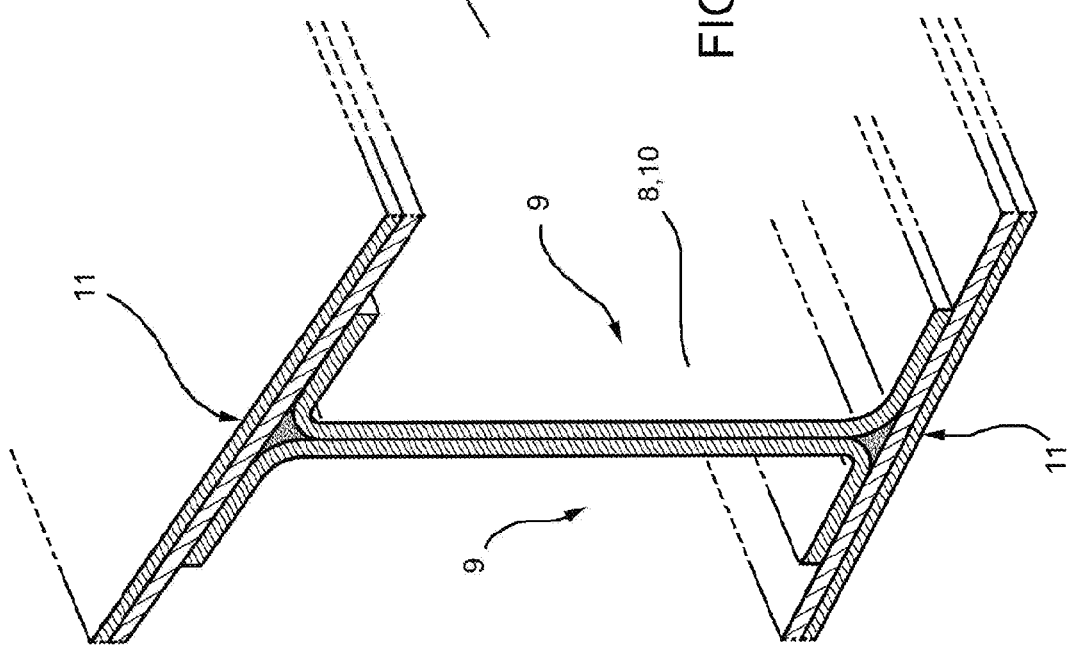
FIG. 17 shows in perspective view two partially sectioned second support tools during a forming and laminating operation of an interconnection element of the monolithic structure according to the variant of FIG. 16 by means of prepreg composite material.

The variant of FIG. 16 shows a structure 1 in which the ribs 10 have an I-shaped cross section and are obtained by joining two profiled elements 22 so as to arrange the respective main portions 23 in contact face-to-face and the end appendages 24 projecting from opposite sides (FIG. 17).

From an examination of the characteristics of the structure 1 and of the method for manufacturing it described above, the advantages that can be obtained are evident.

In particular, the wings 4 and the empennages 5 with the structure 1, which has both spar members 13 and ribs 10, are highly performing not only in bending but also in torsion.

In other words, structure 1 exhibits the same behaviour as the structures of known type with respect to flexural loads but allows for a better response to torsional loads during operation.

Furthermore, the method described is simplified and faster than the known ones since the prepreg material is laminated directly on the support tools 15, 21 and not on suitable preforming tools and then transferred to the support tools.

Finally, it is not necessary to extract the support tools 15, 21 before the curing step, as these tools assume a flexible elastomeric state during the curing operation by pressing uniformly on the prepreg material.

It is clear that modifications and variations can be made to the structure 1 and to the related manufacturing method described and shown herein without thereby departing from the scope of protection defined by the claims.

In particular, the support tools 15, 21 could be made of polystyrene or other low-melting thermoplastic material, so that at the curing temperature these tools melt and "disappear"; the curing pressure would be applied through the tubular bags 27.

In this case, using low melting materials of the type indicated above for the support tools 15, 21, the only operation to be carried out after the curing would be the extraction of the tubular bags 27.

A further alternative could be represented by support tools that are soluble in water or other liquids.

In the latter case, at the end of the curing operation, the removal of the support tools 15, 21 would be achieved by dissolving them with water or a dedicated solvent.

The invention claimed is:

1. Method of manufacturing a monolithic structure (1) in composite material for wings (4) or empennages (5) of aircraft (2), said structure (1) being manufactured starting from a prepreg material with a fiber-reinforced polymer matrix and comprising:
   a first wall (6);
   a second wall (7) facing, along its own surface of greatest extension, to a surface of greatest extension of said first wall (6) and arranged spaced from the first wall (6) itself by a non-zero amount; and
   at least one interconnection element (8) extending transversely between said first and second wall (6, 7), connected to them and delimiting with the first and second wall (6, 7) themselves respective first elongated cavities (9);
   wherein said first and second wall (6, 7) extend symmetrically at opposite sides of a direction (B), coinciding in use with an extension direction of said wing (4) or said empennage (5), from a root portion (4a), connected to a fuselage (3) of said aircraft (1), to a free end portion (4b) of the wing (4) or empennage (5) themselves;
   wherein said interconnection element (8) is a rib (10) extending transversely to said direction (B), and
   wherein at least one (6, 7) of said first and second walls (6, 7) has a sandwich configuration and comprises:
   a first panel (11) facing another (7, 6) of said first and second wall (6, 7);
   a second panel (12) facing said first panel (11); and
   at least one spar member (13), which extends transversely between said first and second panel (11, 12), is connected to them, delimits with the first and second panel (11, 12) themselves respective second elongated cavities (14) and extends transversely to said rib (10);
   said method comprising the steps of:
   a) providing at least two elongated first support tools (21), each having a cross section with a polygonal external profile complementary to the profile of the first cavities (14) to be formed in said structure (1);
   b) placing laterally said first support tools (21) side by side so as to interpose between them one or more layers of said prepreg material destined to form said rib (10);
   c) providing at least two second elongated support tools (15), each having a cross section with a polygonal external profile complementary to the profile of the second cavities (8) to be formed in said structure (1);
   d) placing laterally said second support tools (15) side by side so as to interpose between them one or more layers of said prepreg material destined to form said spar member (13);
   e) forming at least three distinct skins (11a, 12a) by laminating, for each of them, one or more layers of said prepreg material;
   f) inserting between a first and a second of said skins (11a, 12a) the assembly formed by said second support tools (15) and by said prepreg material interposed between them so as to form said one (6) of said first and second wall (6, 7);
   g) inserting between said second skin (11a) and a third (11a) of said skins (11a, 12a) the assembly formed by said first support tools (21) and said prepreg material interposed between them;
   h) bringing the group formed in steps a) to g) into an autoclave at a predefined curing temperature and pressure;
   wherein:
   said first and second support tools (21, 15) are internally hollow and have a composition such as to assume a rigid state at room temperature;
   said first support tools (21) have prevailing directions of extension transversal to the prevailing directions of extension of said second support tools (15); and
   steps b) and d) are carried out by directly laminating said prepreg material on the external surface of the walls (25, 16) of said first and second support tools (21, 15) in the rigid state.

2. Method according to claim 1, wherein said first and second support tools (21, 15) have a composition based on reinforcing material and polymer suitable to allow the passage from said rigid state to a flexible elastomeric state and vice versa in response to heating and cooling respectively; wherein said first and second support tools (21, 15) are configured to assume said flexible elastomeric state at a temperature below the curing temperature and above 50° C.; and wherein, during step h), the curing pressure is applied both inside the autoclave and inside said first and second support tools (21, 15), whose walls (25, 16) are made flexible by the passage from the rigid state to the flexible elastomeric state and are therefore pushed by the curing pressure itself to adhere to said adjacent prepreg material.

3. Method according to claim 2, wherein the polymer of said first and second support tools (21, 15) is a shape memory thermosetting or thermoplastic polymer, and wherein the reinforcing material of said first and second support tools (21, 15) includes one or more elastic fibers.

4. Method according to claim 1, wherein said first and/or second support tools (21, 15) are made of a low-melting thermoplastic material, in particular polystyrene, and are externally coated with tubular bags (27) in such a way that, during step h), said first and/or second support tools (21, 15) dissolve and the curing pressure is applied through said tubular bags (27).

5. Method according to claim 1, wherein said first and/or second support tools (21, 15) are made of a material soluble in a given solvent, for example water.

6. Method according to claim 1, wherein also said other (7, 6) of said first and second walls (6, 7) of said structure (1) comprises the same sandwich configuration as said one of said first and second walls (6, 7), said method comprising the further steps of:

i) forming a fourth skin (12a) by laminating one or more layers of said prepreg material; and l) inserting between the said third and fourth skin (11a, 12a) a further assembly formed by said second support tools (15) and by said prepreg material interposed between them so as to form in a sandwich configuration also said another (7, 6) of said first and second wall (6, 7).

7. Method according to claim 1, wherein the distance between said first and second panels (11, 12) of said one (6, 7) of said first and second wall (6, 7) is smaller than the distance of said first panel (11) from said another (7, 6) of said first and second wall (6, 7).

8. Method according to claim 1, wherein the distance between said first and second panel (11, 12) of each of said first and second wall (6, 7) is smaller than the distance between said first panels (11) facing each other.

9. Method according to claim 1, wherein said rib (10) is a profiled element with an open or closed cross section.

10. Method according to claim 1, wherein said spar member (13) has an open or closed cross section.

* * * * *